US007536463B2

(12) United States Patent
Seo

(10) Patent No.: US 7,536,463 B2
(45) Date of Patent: May 19, 2009

(54) TERMINAL REGISTRATION METHOD USING SESSION INITIATION PROTOCOL

(75) Inventor: Cheong-Jeong Seo, Suwon (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1230 days.

(21) Appl. No.: 10/721,177

(22) Filed: Nov. 26, 2003

(65) Prior Publication Data

US 2004/0105433 A1    Jun. 3, 2004

(30) Foreign Application Priority Data

Dec. 2, 2002    (KR)    .................. 10-2002-0076049

(51) Int. Cl.
*G06F 15/16* (2006.01)
(52) U.S. Cl. .................. 709/227; 709/228; 709/229
(58) Field of Classification Search ............. 709/227, 709/228, 229
See application file for complete search history.

(56) References Cited

U.S. PATENT DOCUMENTS

| | | | |
|---|---|---|---|
| 5,210,787 A | 5/1993 | Hayes et al. | |
| 6,571,095 B1 | 5/2003 | Koodli | |
| 6,584,490 B1 | 6/2003 | Schuster et al. | |
| 6,625,141 B1 | 9/2003 | Glitho et al. | |
| 6,856,616 B1 * | 2/2005 | Schuster et al. | 370/352 |
| 7,035,248 B2 * | 4/2006 | Wengrovitz | 370/352 |
| 7,151,781 B2 * | 12/2006 | MeLampy et al. | 370/468 |
| 7,224,800 B1 * | 5/2007 | Flykt et al. | 380/247 |
| 2002/0129236 A1 * | 9/2002 | Nuutinen | 713/151 |
| 2003/0050051 A1 | 3/2003 | Vilander | |
| 2003/0120813 A1 * | 6/2003 | Majumdar et al. | 709/247 |
| 2003/0167343 A1 | 9/2003 | Furuno | |
| 2003/0200260 A1 * | 10/2003 | Donovan et al. | 709/203 |
| 2006/0168303 A1 * | 7/2006 | Oyama et al. | 709/231 |
| 2007/0124427 A1 * | 5/2007 | Light et al. | 709/218 |

FOREIGN PATENT DOCUMENTS

WO    WO 03/058919 A1    7/2003

OTHER PUBLICATIONS

Examination Report under §18(3) issued by the Patent Office of Great Britain in Applicant's corresponding British Application No. GB0327234.1 issued on Apr. 1, 2004 together with Search Report under §17 issued by the Patent Office of Great Britain in Applicant's corresponding British Application No. GB0327234.1 issued on Mar. 31, 2004.

* cited by examiner

*Primary Examiner*—John Follansbee
*Assistant Examiner*—Nghi V Tran
(74) *Attorney, Agent, or Firm*—Robert E. Bushnell, Esq.

(57) ABSTRACT

A terminal registration method uses a session initiation protocol, and more specifically a terminal registration method uses a session initiation protocol for increasing system efficiency and minimizing user mistakes by enabling a terminal to perform registration after receiving an IP address and a telephone number from an Internet access device with the use of an MAC address. In addition, in a VoIP (Voice over Internet Protocol) system including a terminal and a session initiation protocol server, a terminal registration method using a session initiation protocol includes obtaining terminal information by transmitting an MAC address to the session initiation protocol server by the terminal, obtaining user registration information by transmitting the obtained terminal information to the session initiation protocol server by the terminal, and registering in the session initiation protocol server by using the obtained user registration information.

24 Claims, 7 Drawing Sheets

FIG. 4A

| S·N | ID | MAC address | Other information |
|-----|----|----|----|

FIG. 4B

| S·N | ID | reason | Other information |
|-----|----|----|----|

TERMINAL REGISTRATION METHOD USING SESSION INITIATION PROTOCOL

CLAIM OF PRIORITY

This application makes reference to, incorporates the same herein, and claims all benefits accruing under 35 U.S.C. §119 from an application for TERMINAL REGISTRATION METHOD USING SESSION INITIATION PROTOCOL earlier filed in the Korean Intellectual Property Office on 2 Dec. 2002 and there duly assigned Serial No. 2002-76049.

BACKGROUND OF THE INVENTION

1. Field of the Invention

The present invention generally relates to a terminal registration method using a session initiation protocol, and more particularly to a terminal registration method using a session initiation protocol for increasing system efficiency and minimizing user mistakes by enabling a terminal to perform registration after receiving an IP (Internet Protocol) address and a telephone number from an Internet access device with the use of an MAC (Media Access Control) address.

2. Description of the Related Art

VoIP (Voice over Internet Protocol) is a communication technology providing a voice telephone service, multimedia conference, and others with the use of Internet protocol, creating various equipments and application services by interworking with IP networks and PSTN (Public Switched Telephone Network).

As for protocols mainly used for Internet phone implementation, there are H.323 suggested by ITU-T (International Telecommunication Union-Telecommunication), SIP (Session Initiation Protocol) of IETF (Internet Engineering Task Force), and MGCP (Media Gateway Control Protocol).

Currently, most equipment and service providers are supporting H.323 protocol of the ITU-T, but it is expected that the SIP of the IETF will be popular due to its various functions and expandability.

Generally, the SIP is an application layer control protocol for establishing, modifying, and terminating calls or multimedia sessions for multimedia communication such as videos and voices, and standards of the SIP are defined in an IETF RFC (request for comments) 2543 document.

The SIP is a portion of the entire framework suggested by an IETF MMUSIC (Multiparty Multimedia Session Control) working group to implement a multimedia multilateral communication system with SDP (Session Description Protocol: IETF RFC2327), SAP (Session Announcement Protocol: IETF RFC2974), RTSP (Real-Time Stream Protocol: IETF RFC2326), and SCCP (Simple Conference Control Protocol).

The SIP is an upper protocol of a UDP/TCP/IP (User Datagram Protocol/Transmission Control Protocol/Internet Protocol) layer, supporting both unicast and multicast sessions to start the sessions by inviting client/server protocols which transmitting/receiving SIP request and SIP response messages in request/response methods, to a multimedia conference.

The SIP request messages in RFC2543 provides 6 basic functions such as INVITE (Invitation for Session Participation), ACK (Confirm for INVITE Request), BYE (Call Terminate), REGISTER (UserAgent is registered in a Database of Redirect Server), CANCEL (Cancel a pending request), and OPTIONS (Queries the capabilities of the server). Moreover, SIP response messages are provided as 1xx (Information Response), 2xx (Successful Response), 3xx (Redirection Response), 4xx (Client Error, Request Failure), 5xx (Server Failure), and 6xx (Global Failure) for status codes.

A VoIP system based on SIP includes an SIP user agent composed of a UAC (User Agent Client) and a UAS (User Agent Server) and an SIP server composed of SIP proxy servers, a redirect server, a location server, and SIP gateways (SIP/H.323 gateway, SIP/PSTN gateway). In the location server, a server application receiving a REGISTER message is called a registration server or a registrar.

When receiving an SIP REGISTER request, an SIP registration server provides access information to other SIP servers.

When registering in a VoIP network to receive a call with a current IP address and a URL (Uniform Resource Locator), the user agent uses a REGISTER method. An SIP registration method is similar to that of a wireless communication terminal, thus a registration process is unnecessary when the user agent makes a call with the proxy server.

However, the registration process is necessary when the user agent receives a call from the proxy server managing a self domain, even though the user agent does not receive a location information service by IP address and SIP URL.

The above registration process is performed as follows: when the UAC is authenticated by transmitting a REGISTER request message to the proxy server from the UAC, the proxy server retransmits the REGISTER request message to a database of the location server and registers in the location server; the location server transmits a 200 OK response message to the proxy server; and when the proxy server retransmits the 200 OK response message to the UAC, the registration process is terminated.

The authentication process during the registration above will be described in detail as follows: the authentication process begins when the UAC transmits a 201 REGISTER message to the proxy server; at this time, among username, realm, and nonce transmitted when the 201 REGISTER message is initially sent, an incorrect nonce value is transmitted on purpose; the proxy server transmits a 401 Error message accordingly; then, the UAC retransmits the 201 REGISTER message, on this occasion, it sends correct values of the username, realm, and nonce; and the proxy server requests registration of the location server when the correct values are received, and terminates the registration.

On the other hand, a user can modify the username used for the registration process by operating keys of a self terminal. Thus, many users may repeatedly use the same username.

When the users repeatedly use the same username, the proxy server may repeatedly register the same value during the registration process. In this case, the proxy server updates the username with a currently registered value, causing a problem that a user who already uses the same username by registration cannot use a self username.

In another words, when using a prior standard SIP, the registration process is performed with user information inputted by users. As a result, if the users directly input or modify various sorts of information and set a repeated value by mistake, users who registered the username in advance may not use self username, thereby deteriorating system efficiency and making management difficult.

SUMMARY OF THE INVENTION

It is therefore an object of the present invention to provide a terminal registration method using a session initiation protocol for enabling a terminal to perform registration by receiving an IP address and a telephone number from an Internet access device with the use of an MAC address, in order to prevent users from setting a repeated value by mistake when the terminal is registered in an SIP server with the session initiation protocol.

It is another object to provide the terminal transmitting a telephone number by obtaining the number from a session initiation protocol server, thus avoiding the need to set specific values by users.

It is yet another object to change the information of the terminal by changing the database of only the session initiation protocol server.

To achieve the above and other objects, in a voice over Internet protocol (VoIP) system including a terminal and an SIP server, the present invention includes the steps of: transmitting an MAC address to the SIP server by the terminal; retrieving a database, and transmitting terminal information of the terminal corresponding to the received MAC address to the terminal by the SIP server receiving the MAC address from the terminal; transmitting a register message including the obtained terminal information and having a field value of a telephone number field as a first predetermined value to the SIP server by the terminal; retrieving the database, and transmitting user registration information in accordance with the terminal information received from the terminal to the terminal by the SIP server receiving the register message including the terminal information and having the field value of the telephone number field as the first predetermined value from the terminal; requesting registration of the SIP server by using the received user registration information by the terminal; and performing registration of the terminal and transmitting a success message to the terminal by the SIP server receiving a registration request signal including the user registration information from the terminal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 4a is a diagram illustrating a request message structure used in FIG. 3, and FIG. 4b is a response message structure diagram used in FIG. 3;

DETAILED DESCRIPTION OF THE PREFERRED EMBODIMENTS

A preferred embodiment of the present invention will be described herein below with reference to the accompanying drawing.

In the following description, well known function or constructions are not described in detail since they would obscure the invention in unnecessary detail.

Figure 1:
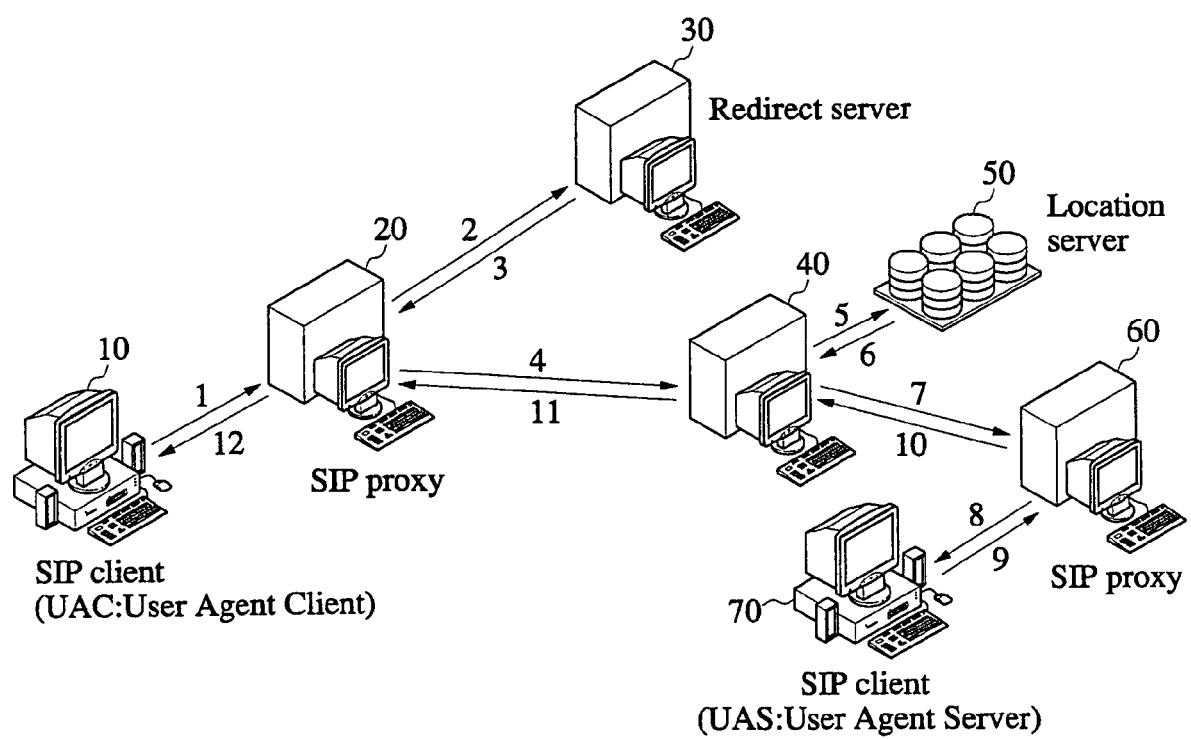
FIG. 1 is a VoIP system format diagram using a session initiation protocol (SIP) applied by the present invention.

FIG. 1 illustrates a VoIP system format diagram using a session initiation protocol (SIP) applied by the present invention.

A VoIP system based on SIP includes an SIP user agent composed of a UAC (User Agent Client) (10) and a UAS (User Agent Server) (70) and an SIP server composed of SIP proxy servers (20, 40, 60), a redirect server (30), a location server (50), and SIP gateways (SIP/H.323 gateway, SIP/PSTN gateway).

In the SIP user agent, a client application for generating and transmitting an SIP request message is called the UAC (User Agent Client), and a server application for generating and transmitting a response message, which means for accepting, rejecting, or redirecting a received request by changing a received address, is called the UAS (User Agent Server).

An end terminal should implement two functions, and an application operated together with the UAC and the UAS is called a UA (User Agent).

In the present invention, SIP clients (10, 70) transmit an MAC address to SIP proxy servers (20,40) by using a broadcasting method, and receive self IP information, Subnet, and DNS (Domain Name Server) information from the SIP proxy server (40) and an SIP proxy server (60).

In addition, the SIP clients (10, 70) set a telephone number to a specific value, for instance, to "0000", transmit a register message including the received IP information and others to the SIP proxy servers (20, 40), and receive self telephone numbers from the SIP proxy servers (40, 60), then request registration by transmitting a register message including the received self telephone numbers to the SIP proxy servers (20, 40).

Meanwhile, the SIP server is a server application receiving an SIP request and an SIP response from the UA, including the proxy servers (20, 40), the redirect server (30), and the location server (50) for an SIP service.

The proxy servers (20, 40, 60) respond to the SIP request transmitted from the UA or forward the SIP request to a next hop.

The proxy server (40) receiving the SIP request transmits the request by obtaining information to determine the next hop from the location server (50). The proxy server can be divided into a stateless proxy server and a stateful proxy server by its operation method.

The stateless proxy server has a processing method based on contents of a currently received request only without storing information on a request or a response message received in advance, and does not store any information on the SIP request message, thereby not performing message retransmission.

On the contrary, the stateful proxy server stores information on messages received in advance, and uses the stored information while processing them in the future.

If the proxy server receiving the SIP request obtains plural transmission paths from the location server, the proxy server can simultaneously transmit a message to many locations. In this case, it is called 'Forking'. The proxy server can be operated as stateless or stateful proxy under certain circumstances. However, it must be operated as stateful proxy during 'Forking' or transmitting with TCP.

When the MAC address is received from the SIP client (10), the SIP proxy servers (20, 40, 60) transmit the MAC address to the location server (50) and request the IP information, Subnet, and DNS information of the SIP client (10).

When the IP information, Subnet, and DNS information are received from the location server (50), the servers transmit the received IP information, Subnet, and DNS information to the SIP client (70).

Also, when the telephone number is set to "0000" and a register message including the IP information and others is received from the SIP client (10), the SIP proxy servers (20, 40) consider that an initial authentication process is performed. Thus, the servers receive a telephone number of the SIP client (10) from the location server (50) by transmitting terminal information of the SIP client (10) to the location server (50), and transmit the received telephone number to the SIP client (70).

When a register message including a telephone number is received from the SIP client (10), the SIP proxy servers (20, 40) parse the received register message to comparatively analyze the data. If the analyzed data is proper, the servers request registration by transmitting the received register message to the location server (50), and when the registration is successful, the servers receive a success message from the location server (50) and transmit the message to the SIP client (70).

Next, when an INVITE message for inviting the other party to participate in a session is received from the SIP client (10) through the proxy server (20), the redirect server (30) obtains location information on the other party from the location server (50), and transmits location information of a receiver to the UAC (caller) through a '302 Moved temporarily' response without transmitting the message to the next hop.

So, the caller (UAC) can invite the other party for communication to participate in the session by directly sending the INVITE message to the party.

Users who want to communicate together by using an SIP register information on locations where they can currently receive a call in the location server (50) with the use of a REGISTER message.

A server application receiving the REGISTER message is called a registration server or a registrar. Servers without location registration functions can response to the REGISTER message as '501 Not Implemented'.

When the location server (50) is requested to transmit terminal information in accordance with the MAC address from the proxy servers (20, 40), the server transmits IP information, Subnet, and DNS information of a terminal to the proxy servers (40, 60) by retrieving a database. When requested to transmit a telephone number and registration information of the terminal from the proxy servers (20,40), the location server transmits the telephone number and the registration information of the corresponding terminal to the proxy servers (40, 60) by retrieving the database.

Moreover, when the location server (50) is requested to register the SIP client (10) from the proxy servers (20, 40), the server registers the client and transmits a 200 OK message. If any problem is generated, the server informs of a reason by transmitting a 401 Error Return message.

In the meantime, the SIP gateways are necessary to interwork with networks using different signaling protocols such as PSTN and H.323 network interworking with an SIP network. There are SIP/PSTN gateway and SIP/H.323 gateway.

Figure 2:
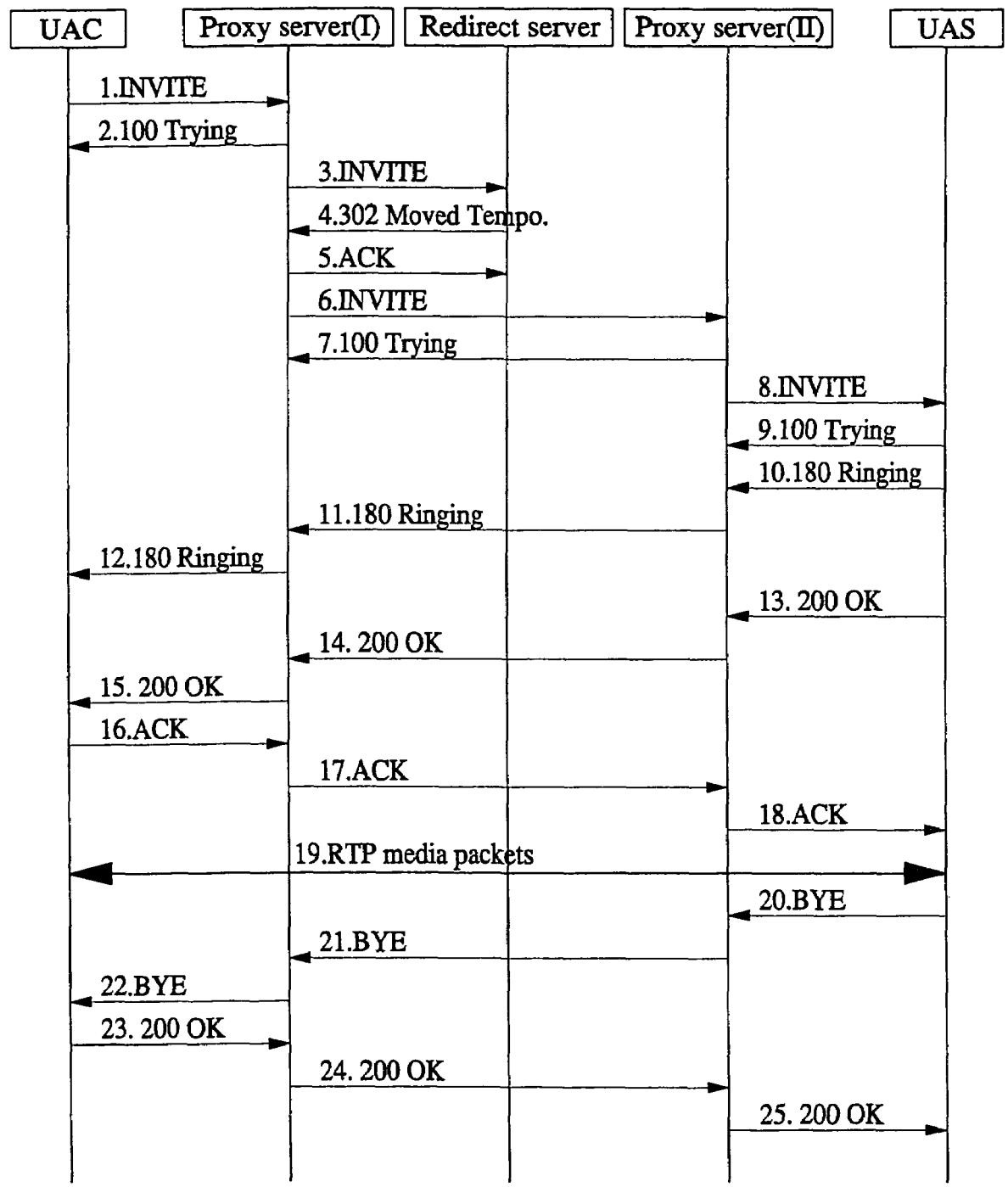
FIG. 2 is a VoIP signal flow chart using a session initiation protocol (SIP) applied by the present invention.

FIG. 2 is a VoIP signal flow chart using a session initiation protocol (SIP) applied by the present invention, comprising a step of registering a UA (User Agent) SIP URL; a step of setting an SIP call (1~18); a step of transceiving RTP media data (19), and a step of canceling the SIP call (20~25).

First, when a UAC is authenticated by transmitting a REGISTER request message to a proxy server (I), the proxy server (I) performs registration by transmitting the REGISTER request message to a database of a redirect server. The redirect server transmits a 200 OK response message to the proxy server (I) by responding to the REGISTER request message. When the proxy server (I) retransmits the 200 OK response message to the UAC, the registration is terminated.

After the registration process, when the UAC transmits an INVITE request message to the proxy server (I) (1), the proxy server (I) transmits a 100 Trying response message informing of a call attempt to the UAC (2), and the proxy server (I) transmits the INVITE request message to the redirect server (3). When the redirect server transmits a 302 Moved Temporarily response message to the proxy server (I) by responding to the INVITE request message (4), the proxy server (I) transmits an ACK message to the redirect server (5).

The proxy server (I) sends an INVITE message to a proxy server (II) (6), and the proxy server (II) transmits the 100 Trying response message to the proxy server (I) by responding to the INVITE message (7).

When the proxy server (II) transmits the INVITE request message to a UAS (User Agent Server) (8), the UAS transmits a 100 Trying response message informing of a call procedure to the proxy server (II) (9).

The UAS receiving the INVITE request message for call setup transmits a 180 Ringing response message from the UAS to the proxy server (II), from the proxy server (II) to the proxy server (I), and from the proxy server (I) to the UAC path in a hop-by-hop way, respectively (10, 11, 12). The UAS transmits a 200 OK response message from the UAS to the proxy server (II), from the proxy server (II) to the proxy server (I), and from the proxy server (I) to the UAC in a hop-by-hop way, respectively (13, 14, 15).

At this moment, when the UAC receiving the 200 OK response message transmits an ACK request message from the UAC to the proxy server (I), from the proxy server (I) to the proxy server (II), and from the proxy server (II) to the UAS in a hop-by-hop way, respectively, the call setup is terminated (16, 17, 18).

When the call setup is terminated, an RTP media packet transceives a VoIP voice and packet data between the UAC and the UAS through UDP/IP or TCP/IP (19).

After terminating the RTP data transceiving, when the UAS or the UAC transmits a BYE request message from the proxy server (II) to the proxy server (I), and from the proxy server (I) to UAC path in a hop-by-hop way (20, 21, 22), a 200 OK response message is transmitted from the proxy server (I) to the proxy server (II), and from the proxy server (II) to the UAS path in a hop-by-hop way by responding to the BYE request message, then the call setup is cancelled (23, 24, 25).

Figure 3:
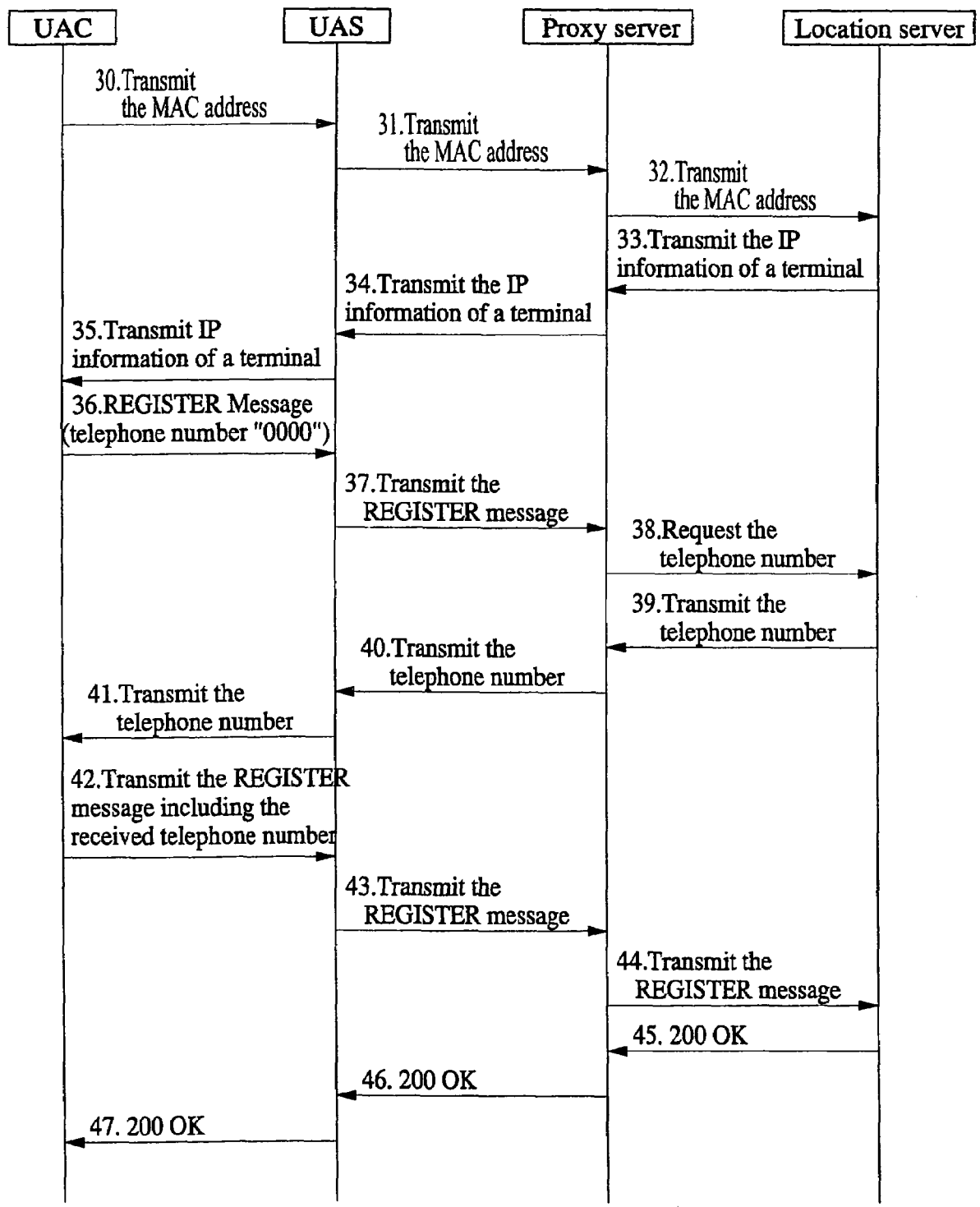
FIG. 3 is a signal flow chart of a terminal registration method using a session initiation protocol in accordance with one embodiment of the present invention.

FIG. 3 is a signal flow chart illustrating a terminal registration method using a session initiation protocol in accordance with one embodiment of the present invention, showing the step of registering the UA (User Agent) SIP URL in detail of FIG. 2.

As illustrated in FIG. 3, a terminal registration method using the session initiation protocol includes a terminal information obtaining step (30~35), a telephone number obtaining step (36~41), and a registration step (42~47).

The terminal information obtaining step obtains IP information, Subnet, and DNS information of a terminal from an SIP server by using an MAC address, and obtains IP information and a gateway of the SIP server. First, the step begins when the terminal transmits the MAC address to a proxy server (30, 31). With a broadcasting method, the MAC address transmission step is performed.

Then, the proxy server requests a location server to transmit terminal information in accordance with the received MAC address (32), and the location server transmits IP information, Subnet, and DNS information of the terminal to the proxy server by retrieving a database for the terminal information of the terminal in accordance with the MAC address (33).

The proxy server transmits the received IP information, Subnet, and DNS information of the terminal to the terminal with the IP information and the gateway of the SIP server (34, 35).

Next, the telephone number obtaining step starts when the terminal receiving the terminal information retransmits the received terminal information to the proxy server by using a register method. At this point, a telephone number is set to "0000" (36, 37). Here, "0000" is rarely used among users, and if there are other numbers rarely used by the users, it is possible to use the numbers.

The proxy server receiving the telephone number "0000" from the terminal considers that an initial authentication is performed. So, the server transmits the received terminal information to the location server (38), requesting the location server to transmit a telephone number and registration information of the corresponding terminal.

The location server requested to transmit the telephone number and the registration information of the terminal transmits the telephone number and the registration information of the corresponding terminal to the proxy server by retrieving a database (39). When the proxy server transmits the received telephone number and the registration information to the terminal, the server transmits them by inputting information obtained within a 401 Error Message (40, 41).

The terminal receiving the telephone number and the registration information from the proxy server sets new values, and performs a registration process. At this time, the terminal encodes the received telephone number and the registration information to MD5, and sends the encoded number and the information to the proxy server by using a register method (42, 43).

The proxy server receiving the register message from the terminal comparatively analyzes the register message. When the message is successful, the proxy server transmits the received register message to the location server, to perform registration in the location server. After the location server performs the registration, it transmits a 200 OK message. When a problem is generated, the proxy server transmits a 401 Error Return message, and informs of a reason for the error message (44~47).

FIG. 4a is a diagram illustrating a request message structure used in FIG. 3, and FIG. 4b is a diagram illustrating a response message structure used in FIG. 3.

As illustrated in FIG. 4a, a request message is composed of an SN (Sequence Number), an ID (Identification), an MAC address, and other information. The ID is set to show a request, and the MAC address includes MAC addresses of each terminal.

As illustrated in FIG. 4b, a response message is composed of an SN (Sequence Number), an ID (Identification), a reason, and other information. The ID is set to show a response, and the reason includes various reasons of success or failure.

Figure 5:
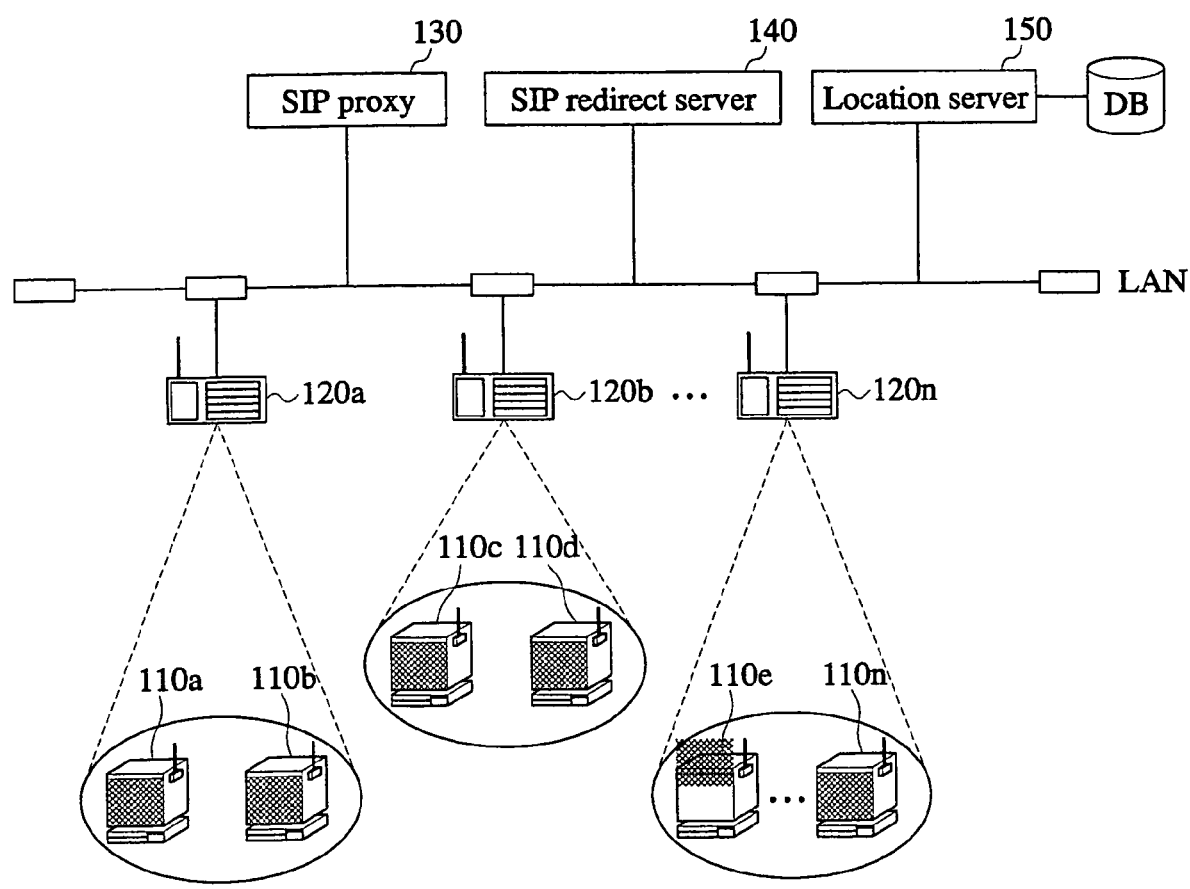
FIG. 5 is a diagram illustrating a wireless LAN environment in accordance with another embodiment of the present invention.

FIG. 5 is a diagram illustrating a wireless LAN (Local Area Network) environment in accordance with another embodiment of the present invention.

As illustrated in FIG. 5, the wireless LAN environment in accordance with another embodiment of the present invention includes user agents (generally, PDAs (personal digital assistants), or other types of palmtops, or portable computers such as laptops, notebooks, tablet personal computers or other types of portable or personal computers capable of wireless LAN support) (110a~110n) including wireless LAN cards (CF (Compact Flash) types, PCMCIA (Personal Computer Memory Card International Association) types, etc.), APs (Access Points) (120a~120n) of wireless LAN, a SIP proxy server (130), a SIP redirect server (140), and a location server (150) with database DB.

Through narrowband microwave, infrared, and spread spectrum-based technologies, the user agents (110a~110n) communicate with the access points (120a~120n).

Spread spectrum and narrowband wireless LANs use ISM (Industrial, Scientific, Medical) bands, and an infrared LAN uses a frequency band just below visible rays. The ISM bands designated for industrial, scientific, and medical use include 902-928 MHz (megahertz), 2.4-2.484 GHz (gigahertz), and 5.725-5.850 GHz frequency bands. When using a spread spectrum method spreading signals, a lot of frequency bands are used, thereby deteriorating efficiency but maintaining stability and reliability. Thus, many commercial products are currently using spread spectrum technologies.

Furthermore, the access points (120a~120n) perform user agent server functions, and can be implemented with redirect and register functions.

Figure 6:
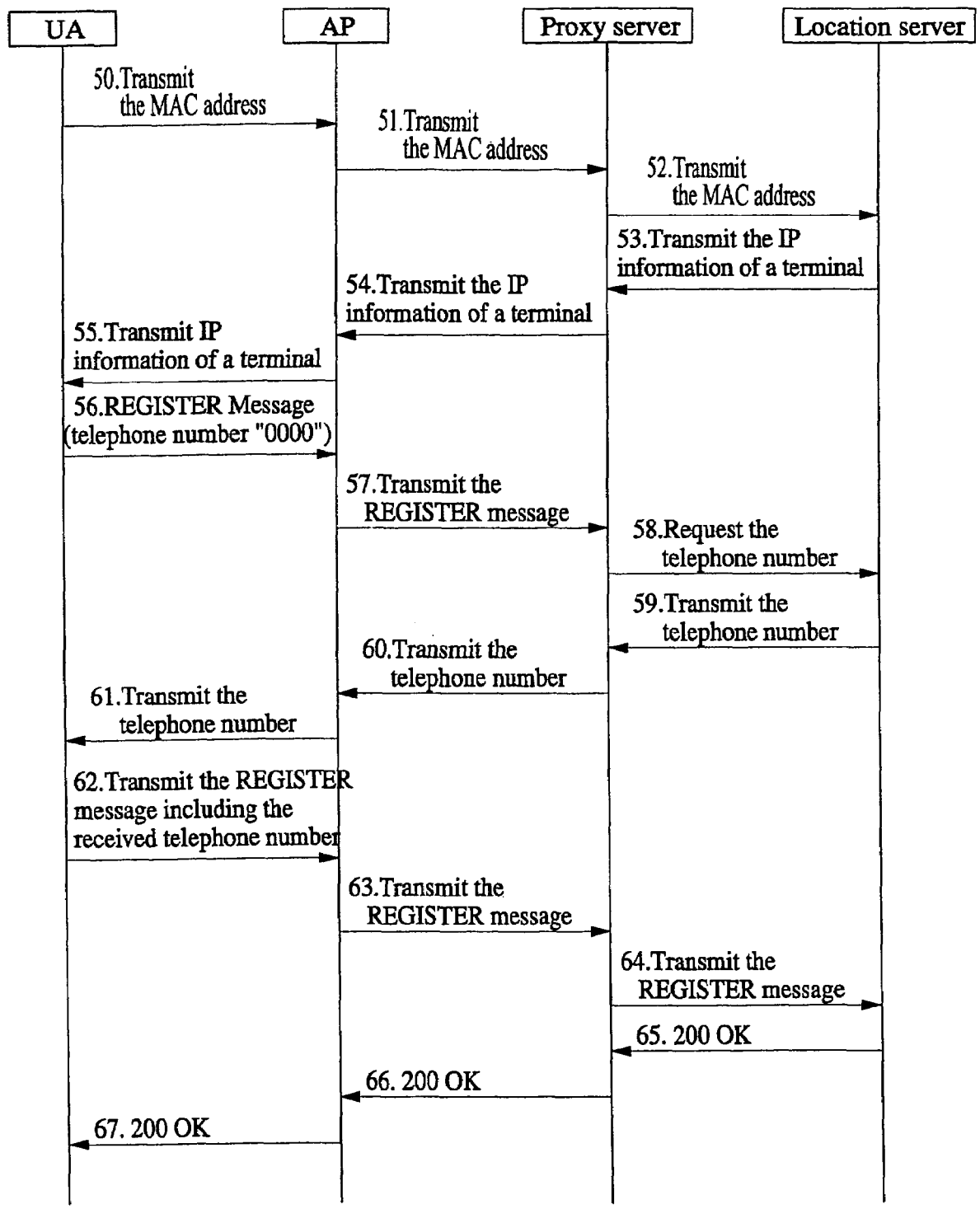
FIG. 6 is a signal flow chart of a terminal registration method using a session initiation protocol under a wireless LAN environment in accordance with another embodiment of the present invention.

FIG. 6 is a signal flow chart of a terminal registration method using a session initiation protocol under a wireless LAN environment in accordance with another embodiment of the present invention.

As illustrated in FIG. 6, the terminal registration method using the session initiation protocol includes; a first step of obtaining a terminal information (50~55); a second step of obtaining a telephone number (56~61); and a third step of registrating a terminal (62~67).

The first step of obtaining the terminal information obtains IP information, Subnet, and DNS information of a terminal from an SIP server, and obtains IP information and a gateway of the SIP server by using an MAC address. The terminal broadcasts the MAC address (50), and plural or one of many access points transmits the MAC address to a proxy server after receiving a request (51).

Next, the proxy server receiving the MAC address from the access point requests a location server to transmit terminal information in accordance with the received MAC address (52), and the location server transmits the IP information, Subnet, and DNS information of the terminal to the proxy server by retrieving a database for the terminal information of the terminal in accordance with the MAC address (53).

The proxy server transmits the received IP information, Subnet, and DNS information of the terminal to the access point (54), and the access point transmits the IP information, Subnet, and DNS information of the terminal and IP information and a gateway of the access point to the terminal (55).

The second step of obtaining the telephone number starts when the terminal receiving the terminal information retransmits the received terminal information to the proxy server through the access point by using a register method, and at this time, a telephone number is set to "0000" (56, 57). Alternatively to "0000", other numbers and/or symbols that are rarely used by the users can also be used.

The proxy server receiving the "0000" telephone number from the terminal considers that an initial authentication is performed, and requests the location server to transmit a telephone number and registration information of the corresponding terminal by transmitting the received terminal information to the location server (58).

The location server requested to transmit the telephone number and the registration information of the terminal transmits the telephone number and the registration information of the corresponding terminal to the proxy server by retrieving a database (59). The proxy server transmits the received telephone number and the registration information to the access point, and the access point transmits the telephone number and the registration information of the terminal to the terminal by inputting information obtained within a 401 Error Message (60, 61).

The terminal receiving the telephone number and the registration information from the proxy server performs a registration process after setting new values. That is, the terminal encodes the received telephone number and the registration information to MD5, and transmits the number and the information to the access point by using a register method. Then, the access point sends the telephone number and the registration information to the proxy server (62, 63).

The proxy server receiving a register message from the terminal comparatively analyzes the message, and if the message is successful, the proxy server transmits the register message to the location server, to perform registration (64). The location server transmits a 200 OK message after performing the registration, and if any problem is generated, the location server transmits a 401 Error Return message, and informs of a reason for the error message (65~67).

The present invention can be realized as computer-executable instructions in computer-readable media. The computer-readable media includes all possible kinds of media in which computer-readable data is stored or included or can include any type of data that can be read by a computer or a processing unit. The computer-readable media include for example and is not limited to, storage media, such as magnetic storage media (e.g., ROMs, floppy disks, hard disk, and the like), optical reading media (e.g., CD-ROMs (compact disc-read-only memory), DVDs (digital versatile discs), re-writable versions of the optical discs, and the like), hybrid magnetic optical disks, organic disks, system memory (read-only memory, random access memory), non-volatile memory such as flash memory or any other volatile or non-volatile memory, and other semiconductor media, electronic media, electromagnetic media and infrared media. The data may be transmitted via a communication medium such as carrier waves (e.g., transmission via the Internet or another computer). The transmission paths of a communication medium generally carry computer-readable instructions, data structures, program modules or other data in a modulated signal such as the carrier waves or other transportable mechanism including any information delivery media. Computer-readable media may also be transmitted via such as a wireless media such as radio frequency, infrared microwaves, and wired media such as a wired network. Also, the computer-readable media can store computer-readable codes that are distributed in computers connected via a network. The computer readable medium also includes cooperating or interconnected computer readable media that are in the processing system or are distributed among multiple processing systems that may be local or remote to the processing system. The present invention can include the computer-readable medium having stored thereon a data structure including a plurality of fields containing data representing the techniques of the present invention.

Figure 7:
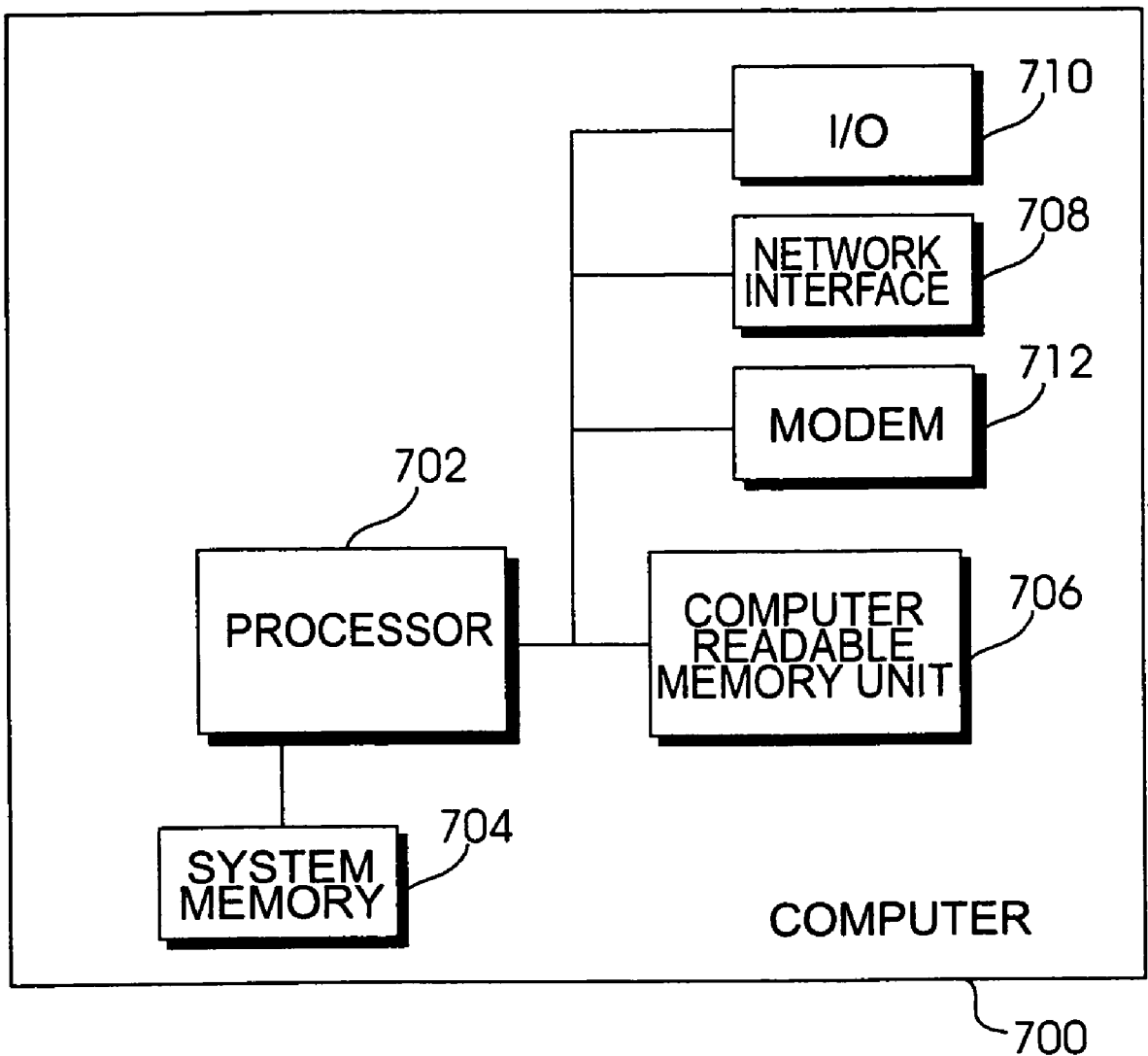
FIG. 7 shows an example of a computer including a computer-readable medium having computer-executable instructions for performing a method of the present invention.

An example of a computer, but not limited to this example of the computer, that can read computer readable media that includes computer-executable instructions of the present invention is shown in FIG. 7. The computer 700 includes a processor 702 that controls the computer 700. The processor 702 uses the system memory 704 and a computer readable memory device 706 that includes certain computer readable recording media. A system bus connects the processor 702 to a network interface 708, modem 712 or other interface that accommodates a connection to another computer or network such as the Internet. The system bus may also include an input and output interface 710 that accommodates connecting to a variety of other devices.

It is to be understood that changes and modifications to the embodiments described above will be apparent to those skilled in the art, and are contemplated. It is therefore intended that the foregoing detailed description be regarded as illustrative rather than limiting, and that it be understood that it is the following claims, including all equivalents, that are intended to define the spirit and scope of this invention.

In conclusion, according to the present invention, a terminal transmits a telephone number by obtaining the number from an SIP server. Thus, there is no need to set specific values by users, thereby giving convenience to the users.

In addition, according to the present invention, a terminal obtains a telephone number from an SIP server and transmits the number without requesting a user to input the telephone number, thus it can prevent managerial difficulty caused by user mistakes in terms of system management aspects.

Moreover, according to the present invention, when information of a terminal is changed, it can change the information of the terminal by changing a database only of an SIP server, thereby giving user convenience.

Also, according to the present invention, it uses both a proprietary message and an SIP message, thereby preventing down phenomenon caused by system load of a terminal or hacking.

What is claimed is:

1. A terminal registration method using a session initiation protocol, comprising:

transmitting a media access control address to a session initiation protocol server by a terminal in a voice over Internet protocol system including the terminal and the session initiation protocol server;

retrieving a database comprising terminal information for the terminal in accordance with the media access control address, and transmitting to the terminal, from the session initiation protocol server receiving the media access control address from the terminal, the terminal information for the terminal in accordance with the received media access control address;

transmitting to the session initiation protocol server, from the terminal, a register message including the obtained terminal information and including a first predetermined value assigned to a field value of a telephone number field;

retrieving the database, and transmitting to the terminal, from the session initiation protocol sever receiving, from the terminal, the register message including the terminal information and including the first predetermined value assigned to the field value of the telephone number field, a second field value of the telephone number field and user registration information in accordance with the terminal information received from the terminal;

requesting, at the terminal, the session initiation protocol server to perform registration by using the user registration information received by the terminal;

performing the registration of the terminal, and transmitting to the terminal, from the session initiation protocol server receiving, from the terminal, a registration request signal including the user registration information, a registration success message; and the steps of retrieving the database, and transmitting the user registration information further comprising the substeps of:

parsing the register message, and requesting a location server, at the session initiation protocol server receiving, from the terminal, the register message including the terminal information and including the first predetermined value, to transmit the user registration information in accordance with the terminal information;

retrieving the database, and transmitting to the session initiation protocol server, at the location server requested by the session initiation protocol server to transmit the user registration information, the user registration information in accordance with the terminal information; and transmitting to the terminal, from the session initiation protocol server receiving, from the location server, the user registration information, the received user registration information.

2. The method of claim 1, wherein the terminal information includes Internet protocol address, Subnet, and domain name server information of the terminal.

3. The method of claim 1, with the first predetermined value transmitted to the session initiation protocol server from the terminal in the step of transmitting the register message being a predetermined telephone number unused by users.

4. The method of claim 1, during the transmission of the media access control address from the terminal to the session initiation protocol server, the media access control address being transmitted by using a broadcasting method.

5. The method of claim 1, wherein the step of retrieving the database, and transmitting terminal information for the terminal comprises the sub-steps of:

transmitting to the location server, from the session initiation protocol server receiving the media access control address from the terminal, the received media access control address;

retrieving the database, and transmitting to the session initiation protocol server, from the location server receiving the media access control address from the session initiation protocol server, the terminal information in accordance with the received media access control address; and transmitting to the terminal, from the session initiation protocol server receiving the terminal information from the location server, the received terminal information.

6. The method of claim 1, with a message used to transmit the user registration information to the terminal from the proxy server being "401 Error Message".

7. The method of claim 1, with a message used to carry the user registration information from the session initiation protocol server to the terminal being an error message.

8. The method of claim 1, wherein the step of performing the registration of the terminal, and transmitting the registration success message comprises the sub-steps of:

transmitting to the location servers, from the session initiation protocol server receiving, from the terminal, a registration message including the user registration information, the received registration message;

comparatively analyzing the registration message by parsing the registration message, performing registration when the registration message is successful, and transmitting to the session initiation protocol server, from the location server, a success message; and transmitting the received success message from the session initiation protocol server to the terminal.

9. The method of claim 1, wherein a request message comprises at least a sequence number, an identification, and an media access control address; and a response message comprises at least a sequence number, an identification, and a reason.

10. A computer-readable storing media having computer-executable instructions for performing a method, the method comprising:

transmitting a first address from a terminal to a session initiation protocol server;

retrieving a database containing terminal information for the terminal in accordance with the first address, and transmitting the terminal information for the terminal in accordance with the first address received by the session initiation protocol server;

transmitting to the session initiation protocol server, from the terminal, a register message including the terminal information and including a first predetermined value assigned to a field value of a telephone number field;

transmitting to the terminal, from the session initiation protocol sever receiving, from the terminal, the register message including the terminal information and including the first predetermined value assigned to the field value of the telephone number field, a second predetermined value of the telephone number field and user registration information in accordance with the terminal information received from the terminal;

requesting, at the terminal, the session initiation protocol server to perform registration by using the user registration information received by the terminal;

performing the registration of the terminal, and transmitting to the terminal, from the session initiation protocol server receiving, from the terminal, a registration request signal including the user registration information, a registration success message; and the steps of retrieving the database, and transmitting the user registration information further comprising the sub-steps of:

parsing the register message, and requesting a location server, at the session initiation protocol server receiving, from the terminal, the register message including the terminal information and including the first predetermined value, to transmit the user registration information in accordance with the terminal information;

retrieving the database, and transmitting to the session initiation protocol server, at the location server requested by the session initiation protocol server to transmit the user registration information, the user registration information in accordance with the terminal information; and transmitting to the terminal, from the session initiation protocol server receiving, from the location server, the user registration information, the received user registration information.

11. The computer-readable storing media having computer-executable instructions for performing the method of claim 10, wherein the step of retrieving the database, and transmitting terminal information of the terminal comprises the sub-steps of:

transmitting to the location server, from the session initiation protocol server receiving the first address from the terminal, the received first address;

retrieving the database, and transmitting to the session initiation protocol server, from the location server receiving the first address from the session initiation protocol server, the terminal information in accordance with the received first address; and transmitting to the terminal, from the session initiation protocol server receiving the terminal information from the location server, the received terminal information.

12. The computer-readable storing media having computer-executable instructions for performing the method of claim 10, with a message used to transmit the user registration information to the terminal from the proxy server being an error message.

13. The computer-readable storing media having computer-executable instructions for performing the method of claim 10, wherein the step of performing the registration of the terminal, and transmitting a registration success message comprises the sub-steps of:

transmitting to the location server, from the session initiation protocol server receiving, from the terminal, a registration message including the user registration information, the received registration message;

comparatively analyzing the registration message by parsing the registration message, performing registration when the registration message is successful, and transmitting to the session initiation protocol server, from the location server, a success message; and transmitting the received success message from the session initiation protocol server to the terminal.

14. A computer-readable storing media having stored thereon a data structures, comprising:

a first field containing data representing a transmission of a media access control address from a terminal to a session initiation protocol server;

a second field containing data representing a retrieval of a database comprising terminal information for the terminal in accordance with the media access control address, and a transmission, to the terminal, from the session initiation protocol server receiving the media access control address from the terminal, of the terminal information for the terminal corresponding to the received media access control address;

a third field containing data representing a transmission, from the terminal to the session initiation protocol server, of a register message comprising the obtained terminal information and a first predetermined value assigned to a field value of a telephone number field;

a fourth field containing data representing a retrieval of a database, and a transmission, to the terminal, from the session initiation protocol sever receiving, from the terminal, the register message comprising the terminal information and the first predetermined value assigned to the field value of the telephone field, of a second predetermined value of the telephone number field and user registration information in accordance with the terminal information received from the terminal;

a fifth field containing data representing a request, made by the terminal, for requesting the session initiation protocol server to perform registration by using the received user registration information;

a sixth field containing data representing the registration of the terminal, and a transmission, to the terminal, from the session initiation protocol server receiving, from the terminal, a registration request signal including the user registration information, of a registration success message; and the fourth field further comprising:

a first sub-field containing data representing a parse of the register message, and a request made by the session initiation protocol server receiving, from the terminal, the register message including the terminal information and including the first predetermined value assigned to the field value of the telephone number field, for requesting a location server to transmit the user registration information in accordance with the terminal information;

a second sub-field containing data representing the retrieval of the database, and the transmission, to the proxy server, from the location server requested to transmit the user registration information from the proxy server, of the user registration information in accordance with the terminal information; and a third sub-field containing data representing the transmission, to the terminal, from the proxy server receiving, from the location server, the user registration information, of the received user registration information.

15. The computer-readable storing media having stored thereon the data structure of claim 14, wherein the second field comprises:

a fourth sub-field containing data representing a transmission to the location server, from the session initiation protocol server receiving, from the terminal, the media access control address, of a received media access control address;

a fifth sub-field containing data representing the retrieval of the database, and a transmission, to the session initiation protocol server, from the location server receiving the media access control address from the proxy server, of the terminal information in accordance with the received media access control address; and a sixth sub-field containing data representing the transmission, to the terminal, from the session initiation protocol server receiving the terminal information from the location server, of the received terminal information.

16. The computer-readable storing media having stored thereon the data structure of claim 14, wherein the sixth field comprises:

a seventh sub-field containing data representing a transmission, to the location server, from the session initiation protocol server receiving, from the terminal, a registration message including the user registration information, of the received registration message an eighth sub-field containing data representing a comparative analysis of the registration message by parsing the registration message, performing registration when the registration message is successful, and transmitting a success message to the session initiation protocol server by the location server.

17. The computer-readable storing media having stored thereon the data structure of claim 16, wherein the sixth field further comprises:

a ninth sub-field containing data representing a transmission of the received success message from the session initiation protocol server to the terminal.

18. A voice over Internet protocol system, comprising:

a session initiation protocol server; and a terminal transmitting a media access control address to the session initiation protocol server, with the session initiation protocol server retrieving a database comprising terminal information for the terminal in accordance with the media access control address, and the session initiation protocol server transmitting, to the terminal, the terminal information for the terminal corresponding to the received media access control address, with the terminal transmitting a register message including the obtained terminal information and a first predetermined value assigned to a field value of a telephone number field to the session initiation protocol server, with the session initiation protocol server retrieving the database, and the session initiation protocol server transmitting, to the terminal, a second predetermined value of the telephone number field and user registration information in accordance with the terminal information received from the terminal, with the terminal requesting the session initiation protocol server to perform registration by using the received user registration information, with the session initiation protocol server performing the registration of the terminal and transmitting a registration success message to the terminal; and with the session initiation protocol server retrieving the database by:

parsing the register message, and requesting a location server, at the session initiation protocol server receiving, from the terminal, the register message including the terminal information and including the first predetermined value, to transmit the user registration information in accordance with the terminal information, retrieving the database, and transmitting to the session initiation protocol server, at the location server requested by the session initiation protocol server to transmit the user registration information, the user registration information in accordance with the terminal information, and transmitting to the terminal, from the session initiation protocol server receiving, from the location server, the user registration information, the received user registration information.

19. The system of claim 18, wherein the terminal information includes Internet protocol address, Subnet, and domain name server information of the terminal.

20. The system of claim 19, wherein the first predetermined value transmitted to the session initiation protocol server from the terminal in the step of transmitting the register message is an unused telephone number.

21. A method, comprising:

obtaining terminal information, with the step of obtaining the terminal information performed by:

obtaining a certain set of information for a terminal and a server by using a media access control address;

transmitting to a proxy server, from the terminal and at least one of a plurality of access points, the media control address to;

requesting by the proxy server for a location server to transmit terminal information in accordance with a received media access control address;

transmitting to the terminal, from the location server, certain information retrieved from a database of the terminal in accordance with the media access control address, and the database comprising the terminal information for the terminal in accordance with the media access control address; and transmitting to the access points, the certain information retrieved from the database of the terminal, and the access points transmitting, to the terminal, the certain information for the terminal and certain information for the access point;

obtaining a first telephone number, with the obtaining of the first telephone number performed by:

when the terminal receives the terminal information, retransmitting the received terminal information to the proxy server through the access points;

setting the first telephone number to a predetermined unused telephone number;

considering, by the proxy server, authentication of the first telephone number transmitted from the terminal by the setting of the first telephone number to the predetermined unused telephone number;

requesting by the proxy server, the location server to transmit a second telephone number and registration information for the corresponding terminal by transmitting the received terminal information to the location server;

transmitting to the proxy server, by the location server, the second telephone number and the registration information for the corresponding terminal by retrieving a database;

transmitting the received second telephone number and the registration information to the access point; and transmitting to the terminal, from the access point the second telephone number and the registration information for the terminal by inputting information obtained within an error message; and registering the terminal.

22. The method of claim 21, with the registering of the terminal, comprising:

receiving by the terminal, the second telephone number and the registration information from the proxy server performing a registration process after setting new values, with the terminal encoding the received second telephone number and the registration information to a predetermined format;

transmitting, to the access point, the second telephone number and the registration information by using a register method;

sending by the access point, the second telephone number and the registration information to the proxy server;

receiving by the proxy server, a register message from the terminals, comparing the register message, and when the register message is successful, the proxy server transmitting the register message to the location server, to perform registration; and transmitting, by the location server, a predetermined successful message after performing the registration, and when any problem is generated, the location server transmitting a predetermined error message, and informing of a reason for the error message.

23. The method of claim 22, wherein the terminal information includes Internet protocol address, Subnet, and domain name server information of the terminal.

24. The method of claim 21, with the registering of the terminal, comprising:

receiving by the terminal, the second telephone number and the registration information from the proxy server performing a registration process after setting new values, with the terminal encoding the received telephone number and the registration information to a predetermined format;

transmitting, to the access point, the second telephone number and the registration information by using a register method;

sending by the access point, the second telephone number and the registration information to the proxy server;

receiving by the proxy server, a register message from the terminal comparing the register message, and when the register message is successful, the proxy server transmitting the register message to the location server, to perform registration; and transmitting, by the location server, a predetermined message informing of a status after performing the registration.

* * * * *